(12) United States Patent
Chen et al.

(10) Patent No.: US 7,157,888 B2
(45) Date of Patent: Jan. 2, 2007

(54) LIGHT LOADING CONTROL CIRCUIT FOR A BUCK-BOOST VOLTAGE CONVERTER

(75) Inventors: Tien-Tzu Chen, Hsinchu (TW); Yu-Ming Tsai, Tainan County (TW)

(73) Assignee: Aimtron Technology Corp., Hsinchu (TW)

( * ) Notice: Subject to any disclaimer, the term of this patent is extended or adjusted under 35 U.S.C. 154(b) by 60 days.

(21) Appl. No.: 11/160,036

(22) Filed: Jun. 6, 2005

(65) Prior Publication Data

US 2006/0273768 A1 Dec. 7, 2006

(51) Int. Cl.
*G05F 1/613* (2006.01)
(52) U.S. Cl. ........................ 323/224; 323/285
(58) Field of Classification Search ................ 323/224, 323/284, 285
See application file for complete search history.

(56) References Cited

U.S. PATENT DOCUMENTS

| 5,721,483 | A | 2/1998 | Kolluri et al. |
| 5,734,258 | A | 3/1998 | Esser |
| 5,903,139 | A | * 5/1999 | Kompelien ................. 323/282 |
| 6,037,755 | A | 3/2000 | Mao et al. |
| 6,166,527 | A | 12/2000 | Dwelley et al. |
| 6,215,286 | B1 | 4/2001 | Scoones et al. |
| 6,275,016 | B1 | 8/2001 | Ivanov |
| 6,788,033 | B1 | 9/2004 | Vinciarelli |
| 6,831,448 | B1 | 12/2004 | Ishii et al. |

OTHER PUBLICATIONS

Linear Technology Corporation, Micropower Synchronous Buck-Boost DC/DC Converter, pp. 1-pp. 20, 2001.

* cited by examiner

*Primary Examiner*—Shawn Riley
(74) *Attorney, Agent, or Firm*—Winston Hsu

(57) ABSTRACT

A light loading control circuit operates a switching circuit of a buck-boost voltage converter alternately in a plurality of phase cycles and a sleep period. Each phase cycle has a rising phase, a falling phase, and a maintaining phase. In the rising phase, the switching circuit is operated to increase an inductor current. In the falling phase, the switching circuit is operated to decrease the inductor current. In the maintaining phase, the switching circuit is operated to keep the inductor current approximately constant. The sleep period prevents two terminals of an inductor from being respectively coupled to two selected from a group consisting of an input voltage, an output voltage, and a ground potential.

20 Claims, 8 Drawing Sheets

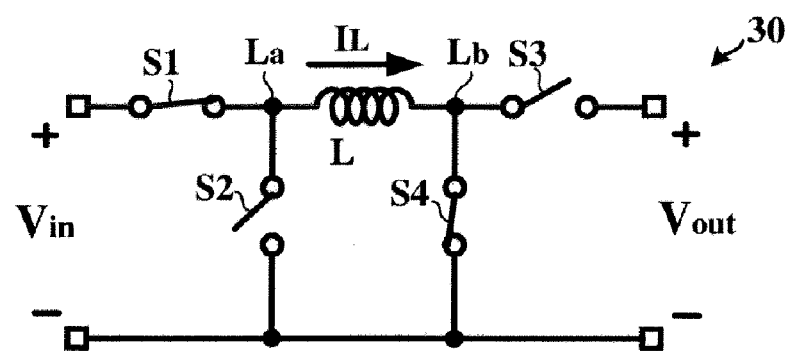
FIG. 5(A)
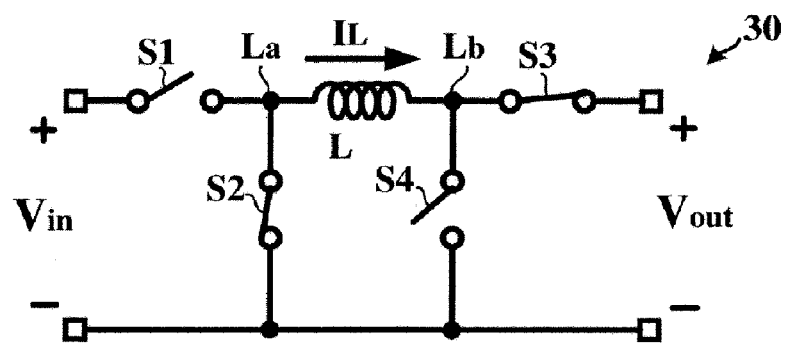
FIG. 5(B)
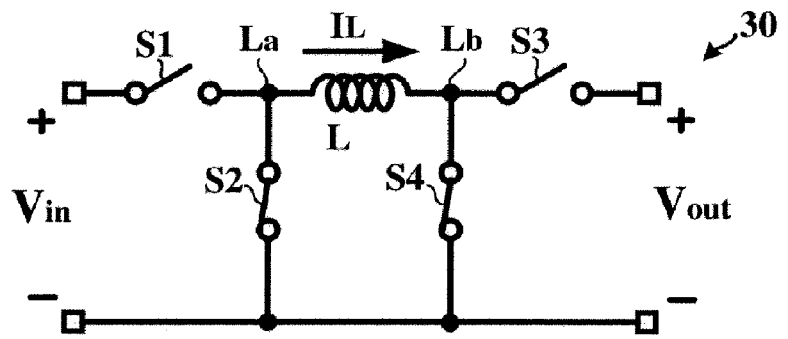
FIG. 5(C)
FIG. 5(D)
|    | Case 1 | Case 2 | Case 3 | Case 4 | Case 5 | Case 6 |
|----|--------|--------|--------|--------|--------|--------|
| S1 | ON     | OFF    | OFF    | OFF    | OFF    | OFF    |
| S2 | OFF    | ON     | OFF    | OFF    | ON     | OFF    |
| S3 | OFF    | OFF    | ON     | OFF    | OFF    | OFF    |
| S4 | OFF    | OFF    | OFF    | ON     | ON     | OFF    |

LIGHT LOADING CONTROL CIRCUIT FOR A BUCK-BOOST VOLTAGE CONVERTER

BACKGROUND OF THE INVENTION

1. Field of the Invention

The present invention relates to a DC/DC voltage converter and, more particularly, to a light loading control circuit for a buck-boost voltage converter.

2. Description of the Related Art

FIG. 1 is a circuit diagram showing a conventional buck-boost voltage converter. Referring to FIG. 1, the conventional buck-boost voltage converter includes a synchronous switching circuit 10, a buck-boost control circuit 11, a drive circuit 12, and a light loading control circuit 13.

The buck-boost control circuit 111 generates a voltage conversion control signal VCS in accordance with a feedback of an output voltage $V_{out}$. In response to the voltage conversion control signal VCS, the drive circuit 12 generates four drive signals D1 to D4 for driving switching units S1 to S4 of the synchronous switching circuit 10, respectively. Through appropriately turning ON/OFF the switching units S1 to S4 and adjusting a relationship between ON time and OFF time, an input voltage $V_{in}$ is effectively regulated to an output voltage $V_{out}$ regardless of the input voltage $V_{in}$ being higher than, equal to, or lower than the output voltage $V_{out}$. In prior art are there a variety of types of the buck-boost control circuit 11, such as the circuits and methods disclosed in U.S. Pat. No. 6,166,527 and U.S. Pat. No. 6,788,033.

If only a relatively small loading current $I_{out}$ is required by a load 50, then the conventional buck-boost voltage converter enters an operation of a light loading mode for enhancing the efficiency in the voltage conversion. In the operation of the light loading mode, the drive circuit 12 is under control of the light loading control circuit 13 instead of responding to the voltage conversion control signal VCS of the buck-boost control circuit 11. One example of the conventional light loading modes in the buck-boost voltage converter is disclosed in FIGS. 3 and 4 on page 10 of Datasheet LTC3440, entitled "Micropower Synchronous Buck-Boost DC/DC Converter," published on year 2001 and by Linear Technology Corporation.

FIG. 2(A) is a timing chart showing an inductor current $I_L$ in the conventional light loading mode. Referring to FIG. 2(A), the conventional light loading mode has a rising phase and a falling phase. In the rising phase from time t1 to t2, the inductor current $I_L$ linearly increases from zero to a peak current $I_{pk}$. In the falling phase from time t2 to t3, the inductor current $I_L$ linearly decreases from the peak current $I_{pk}$ to zero.

FIG. 2(B) is a schematic diagram showing an operation state of the synchronous switching circuit 10 in the rising phase. Referring to FIG. 2(B), the switching units S1 and S4 are turned ON and the switching units S2 and S3 are turned OFF, for coupling a first terminal La of an inductor L to the input voltage $V_{in}$ and coupling a second terminal Lb of the inductor L to a ground potential. Therefore, an inductor current $I_L$ linearly increases with a rate of $V_{in}/L$.

FIG. 2(C) is a schematic diagram showing an operation state of the synchronous switching circuit 10 in the falling phase. Referring to FIG. 2(C), the switching units S1 and S4 are turned OFF and the switching units S2 and S3 are turned ON, for coupling the first terminal La to the ground potential and coupling the second terminal Lb to the output voltage $V_{out}$. Therefore, the inductor current $I_L$ linearly decreases with a rate of $V_{out}/L$.

For operating in the conventional light loading mode, an average of the loading current $I_{out}$ is subjected to an upper limit, which may be calculated in accordance with the following equation (1):

$$I_{out\_ave(max)} = \left(\frac{I_{pk}}{2}\right)\left(\frac{V_{in}}{V_{in} + V_{out}}\right) \qquad (1)$$

If the loading current $I_{out}$ to be required becomes higher than the maximum average light loading current $I_{out\_ave(max)}$, then the conventional buck-boost voltage converter leaves the light loading mode and returns to the normal operation under the control of the buck-boost control circuit 11.

As described above, regardless of the input voltage $V_{in}$ being higher than, equal to, or lower than the output voltage $V_{out}$, the buck-boost voltage converter regulates the input voltage $V_{in}$ into the output voltage $V_{out}$. That is, the buck-boost voltage converter is applicable over a broad range of input voltages $V_{in}$. However, a variation of the input voltage $V_{in}$ induces a change to the maximum average light loading current $I_{out\_ave(max)}$ of the conventional light loading mode. More specifically, a partial derivative of the maximum average light loading current $I_{out\_ave(max)}$ with respect to the input voltage $V_{in}$ may be expressed in the following equation (2):

$$\left(\frac{\partial}{\partial V_{in}}\right)I_{out\_ave(max)} = \left(\frac{I_{pk}}{2}\right)\left(\frac{V_{out}}{(V_{in} + V_{out})^2}\right) \qquad (2)$$

Since the equation (2) is a function of the input voltage $V_{in}$, the light loading control circuit 13 commands the buck-boost voltage converter to leave the light loading mode in association with different maximum average light loading currents $I_{out\_ave(max)}$ with respect to different input voltages $V_{in}$.

Therefore, it is desirable to develop a light loading control circuit capable of stably controlling the activation and termination of the light loading mode of the buck-boost voltage converter over a broad range of input voltages $V_{in}$.

SUMMARY OF THE INVENTION

In view of the above-mentioned problems, an object of the present invention is to provide a light loading control circuit capable of stably controlling activation and termination of a light loading mode of a buck-boost voltage converter over a broad range of input voltages.

Another object of the present invention is to provide a light loading control circuit capable of suppressing influence to a maximum average light loading current induced by a variation of an input voltage.

According to one aspect of the present invention, a light loading control circuit is provided for controlling a switching circuit of a buck-boost voltage converter. The switching circuit has an input switching unit and an output switching unit. The input switching unit selectively couples a first terminal of an inductor to an input voltage and a ground potential. The output switching unit selectively couples a second terminal of the inductor to an output voltage and the ground potential.

The light loading control circuit has a phase control unit and a sleep control unit. The phase control unit operates the switching circuit in a plurality of phase cycles. Each of the phase cycles has a rising phase, a falling phase, and a maintaining phase. In the rising phase, the switching circuit is operated to increase an inductor current flowing through the inductor. Alternatively, the switching circuit is operated to cause a potential difference across the first terminal and the second terminal to have a first polarity. In the falling phase, the switching circuit is operated to decrease the inductor current. Alternatively, the switching circuit is operated to cause the potential difference across the first terminal and the second terminal to have a second polarity. The second polarity is opposite to the first polarity. In the maintaining phase, the switching circuit is operated to keep the inductor current approximately constant. Alternatively, the switching circuit is operated to cause the potential difference across the first terminal and the second terminal to substantially become zero.

After the output voltage reaches a predetermined sleep reference voltage, the sleep control unit operates the switching circuit in a sleep period for preventing the first terminals and the second terminals from being coupled to two selected from a group consisting of the input voltage, the output voltage, and the ground potential. In the sleep period, a loading current is supplied exclusively from a discharge of an output capacitor.

Due to the existence of the maintenance time $T_m$ in the light loading mode according to the present invention, a variation of the maximum average light loading current with respect to the input voltage is suppressed. Therefore, over the broad range of the input voltage, the light loading control circuit according to the present invention stably control the activation and termination of the light loading mode of the buck-boost voltage converter.

BRIEF DESCRIPTION OF THE DRAWINGS

The above-mentioned and other objects, features, and advantages of the present invention will become apparent with reference to the following descriptions and accompanying drawings, wherein:

FIG. 5(A) is a schematic diagram showing an operation state of a synchronous switching circuit in a rising phase;

FIG. 5(B) is a schematic diagram showing an operation state of a synchronous switching circuit in a falling phase;

FIG. 5(C) is a schematic diagram showing an operation state of a synchronous switching circuit in a maintaining phase;

FIG. 5(D) is a schematic diagram showing six operation states of a synchronous switching circuit in a sleep period;

DETAILED DESCRIPTION OF THE PREFERRED EMBODIMENTS

The preferred embodiments according to the present invention will be described in detail with reference to the drawings.

Figure 1:
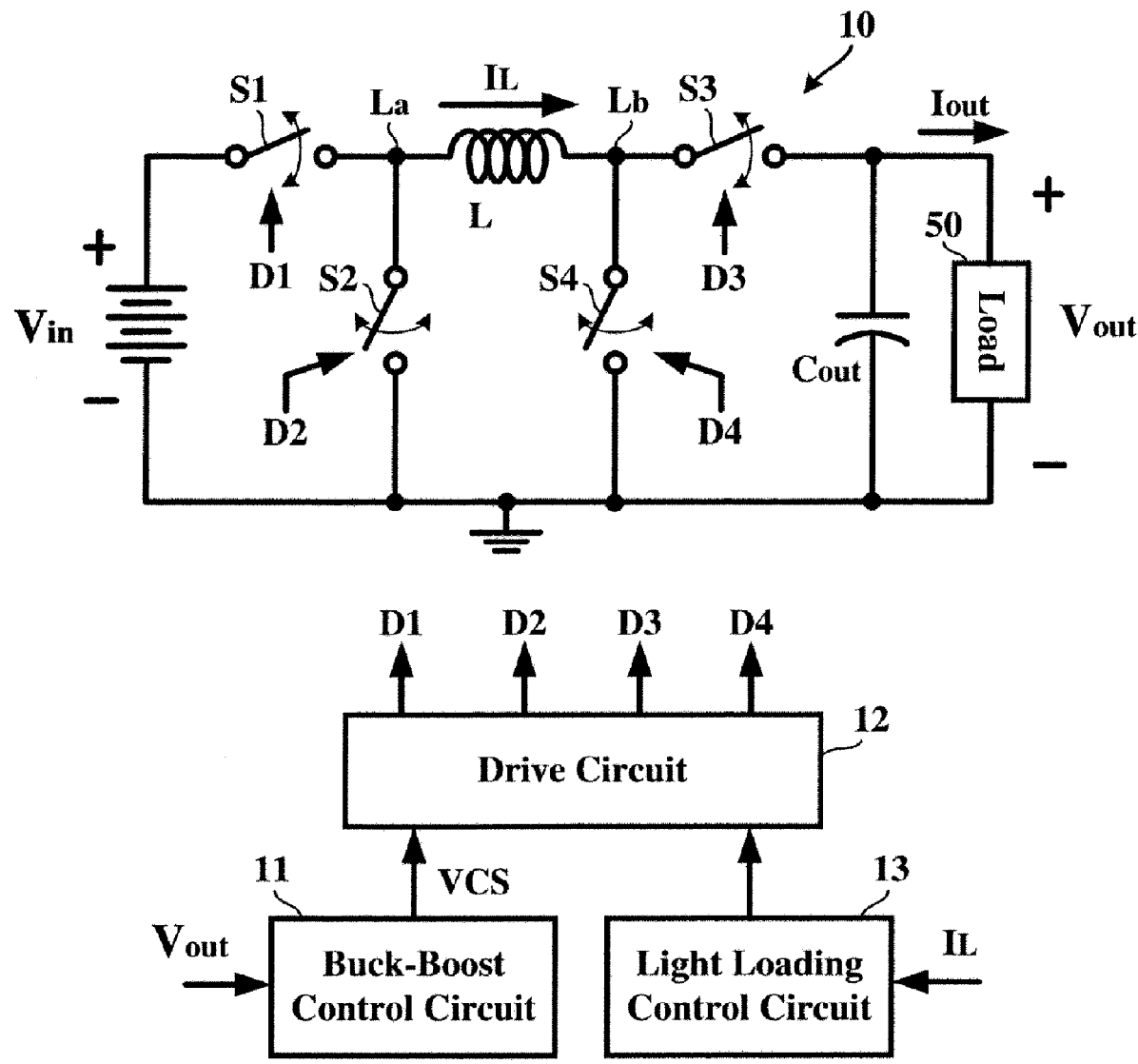
FIG. 1 is a circuit diagram showing a conventional buck-boost voltage converter.
Figure 2A:
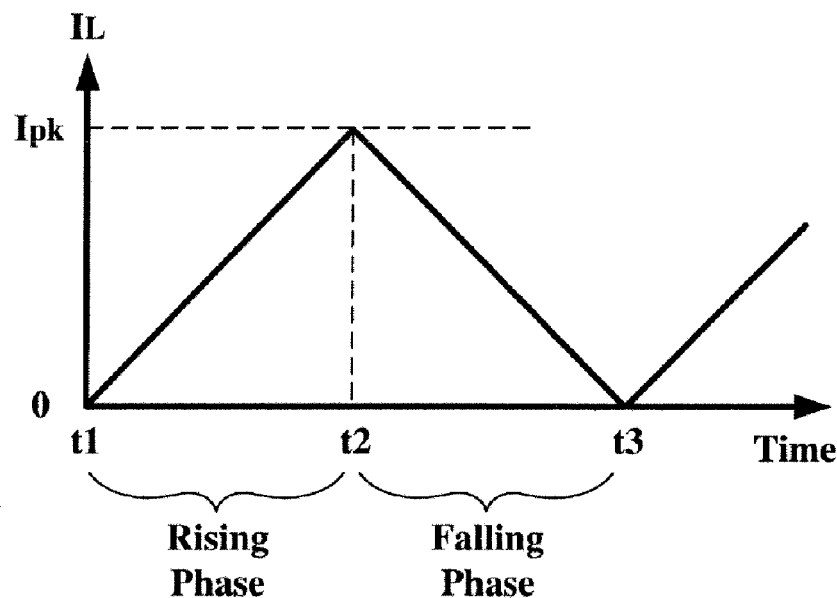
FIG. 2(A) is a timing chart showing an inductor current in a conventional light loading mode.
Figure 2B:
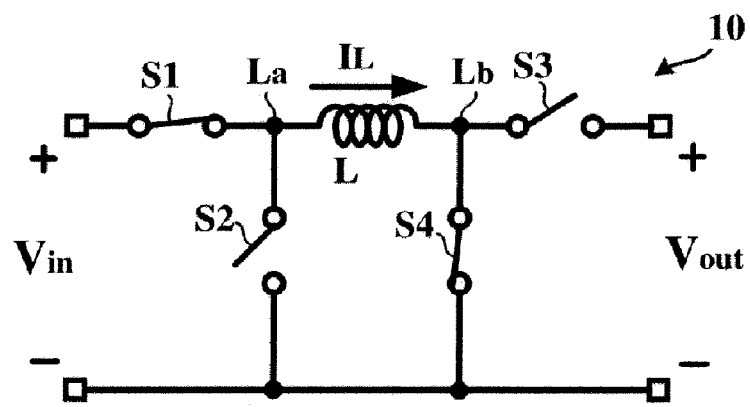
FIG. 2(B) is a schematic diagram showing an operation state of a synchronous switching circuit in a rising phase.
Figure 2C:
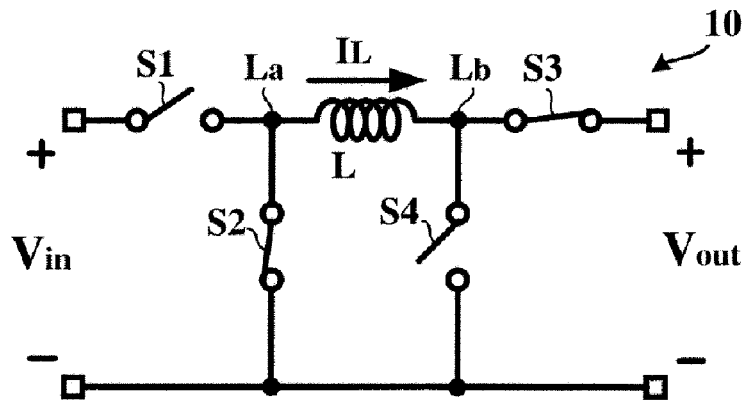
FIG. 2(C) is a schematic diagram showing an operation state of a synchronous switching circuit in a falling phase.
Figure 3:
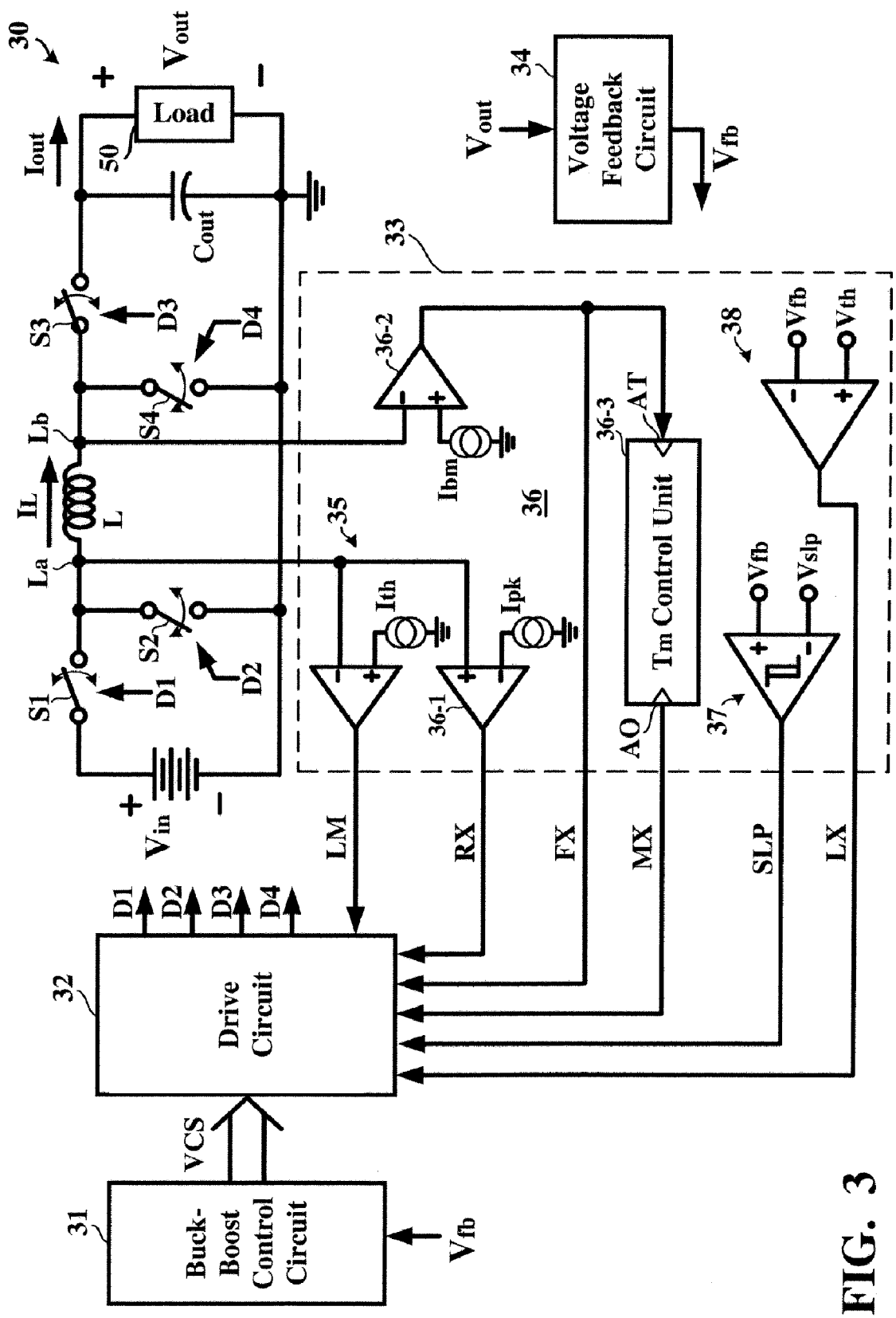
FIG. 3 is a circuit diagram showing a buck-boost voltage converter according to a first embodiment of the present invention.

FIG. 3 is a circuit diagram showing a buck-boost voltage converter according to a first embodiment of the present invention. The buck-boost voltage converter generates a regulated output voltage $V_{out}$ from an input voltage $V_{in}$, which may be higher than, equal to, or lower than the output voltage $V_{out}$. Referring to FIG. 3, the buck-boost voltage converter includes a synchronous switching circuit 30, a buck-boost control circuit 31, a drive circuit 32, a light loading control circuit 33, and a voltage feedback circuit 34.

The synchronous switching circuit 30 has an input switching unit and an output switching unit. More specifically, the input switching unit is configured of a first switching unit S1 and a second switching unit S2 while the output switching unit is configured of a third switching unit S3 and a fourth switching unit S4. The first switching unit S1 is interposed between the input voltage $V_{in}$ and a first terminal La of an inductor L. The second switching unit S2 is interposed between the first terminal La of the inductor L and a ground potential. The third switching unit S3 is interposed between a second terminal Lb of the inductor L and the output voltage $V_{out}$. The fourth switching unit S4 is interposed between the second terminal Lb of the inductor L and the ground potential.

The voltage feedback circuit 34 is coupled to generate a voltage feedback signal Vfb representative of the output voltage $V_{out}$. For example, the voltage feedback circuit 34 may be implemented by a voltage divider made up of a plurality of series-connected resistors.

In response to the voltage feedback signal $V_{fb}$, the buck-boost control circuit 31 generates a voltage conversion control signal VCS for determining the ON/OFF time of the switching units S1 to S4 of the synchronous switching circuit 30. The voltage conversion control signal VCS may include a plurality of component signals, independent or dependent with respect to each other, for individually controlling the switching units S1 to S4. Through the drive circuit 32, four drive signals D1 to D4 are definitely formed in response to the voltage conversion control signal VCS, for respectively driving the switching units S1 to S4. Under appropriate ON/OFF manipulations to each of the switching units S1 to S4, the input voltage $V_{in}$ is converted to the output voltage $V_{out}$, regardless of the input voltage $V_{in}$ being higher than, equal to, or lower than the output voltage $V_{out}$. Since many types of the buck-boost control circuits 31 have been well-known to one skilled in the art, further descriptions are omitted hereinafter for the sake of simplicity. It should be noted that the present invention is directed to the light loading control circuit 33, which may be applied to a variety of buck-boost voltage converters without any special limitations or system requirements.

If only a relatively small loading current $I_{out}$ is required by a load 50, the buck-boost voltage converter enters an operation of a light loading mode for enhancing the efficiency in the voltage conversion. In the operation of the light loading mode, the drive circuit 32 is controlled by the light loading control circuit 33 instead of responding to the voltage conversion control signal VCS of the buck-boost control circuit 31. More specifically, the light loading control circuit 33 includes an activation unit 35, a phase control unit 36, a sleep control unit 37, and a termination unit 38.

The activation unit 35 detects the inductor current $I_L$ and is triggered to generate a light loading activation signal LM as soon as the inductor current $I_L$ becomes lower than a predetermined threshold current $I_{th}$. In response to the light loading activation signal LM, the drive circuit 32 is manipulated by the light loading control circuit 33 for performing a light loading mode with a higher efficiency. For example, the activation unit 35 may be implemented by a current comparator for comparing the inductor current $I_L$ and the threshold current $I_{th}$ and being triggered to generate the light loading activation signal LM when the inductor current $I_L$ falls below the threshold current $I_{th}$.

Figure 4:
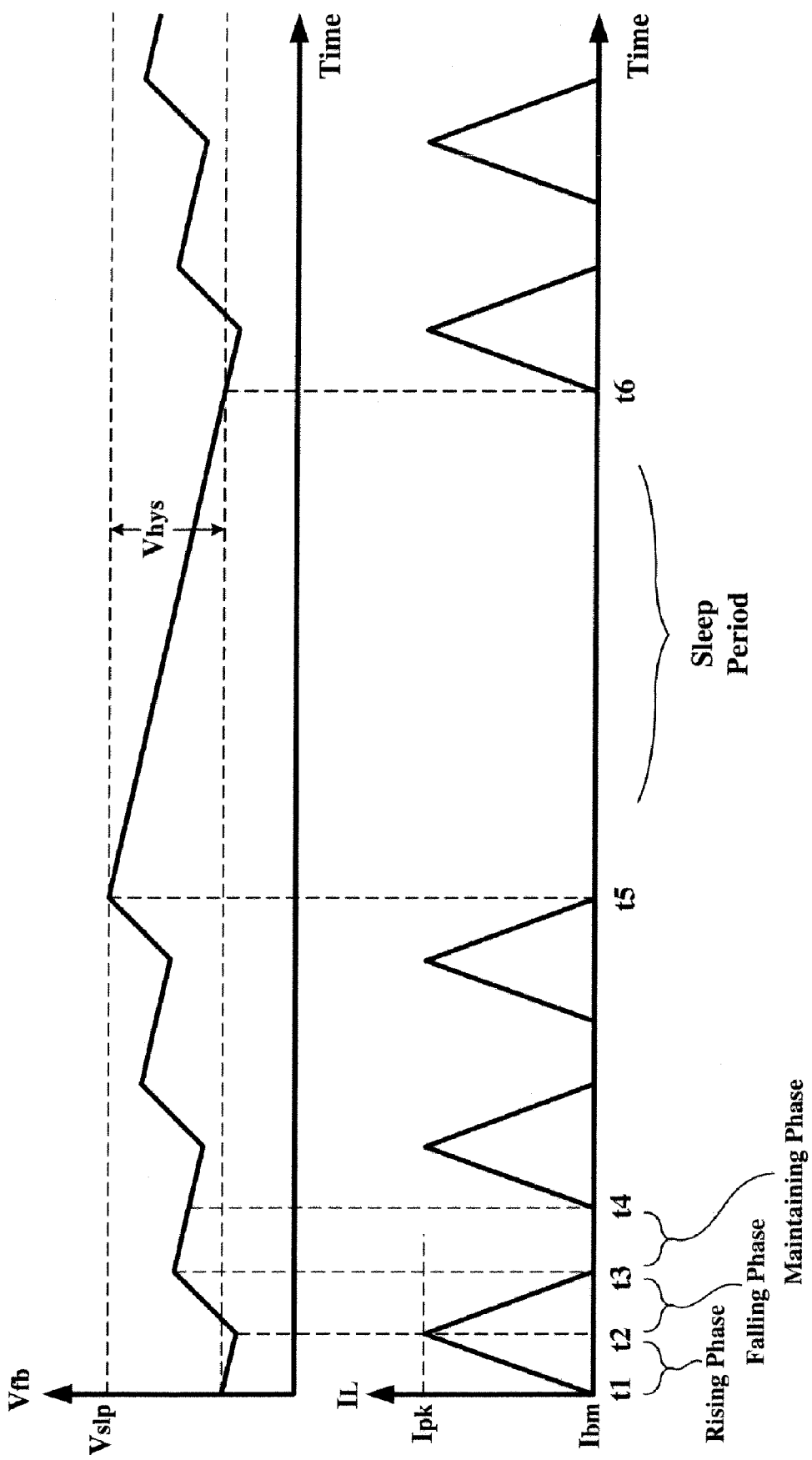
FIG. 4 is a timing chart showing a voltage feedback signal and an inductor current in a light loading mode according to a first embodiment of the present invention.

The phase control unit 36 operates the synchronous switching circuit 30 in a plurality of phase cycles, each of which has a rising phase, a falling phase, and a maintaining phase. As shown in FIG. 4, in the rising phase from time t1 to t2, the inductor current $I_L$ linearly increases from a predetermined bottom current $I_{bm}$ to a predetermined peak current $I_{pk}$. In the falling phase from time t2 to t3, the inductor current $I_L$ linearly decreases from the peak current $I_{pk}$ to the bottom current $I_{bm}$. In the maintaining phase from time t3 to t4, the inductor current $I_L$ is kept approximately constant, i.e. at the bottom current $I_{bm}$ at time t3.

The phase control unit 36 is installed with a current comparator 36-1 for comparing the inductor current $I_L$ and the peak current $I_{pk}$. As soon as the inductor current $I_L$ linearly increases to reach the peak current $I_{pk}$, the current comparator 36-1 is triggered to generate a rising termination signal RX for commanding the drive circuit 32 to terminate the operation of the rising phase of the synchronous switching circuit 30.

The phase control unit 36 is further installed with another current comparator 36-2 for comparing the inductor current $I_L$ and the bottom current $I_{bm}$. As soon as the inductor current $I_L$ linearly decreases to reach the bottom current $I_{bm}$, the current comparator 36-2 is triggered to generate a falling termination signal FX for commanding the drive circuit 32 to terminate the operation of the falling phase of the synchronous circuit 30. For example, the bottom current $I_{bm}$ may be set as a zero.

The phase control unit 36 is further installed with a maintenance time control unit 36-3 for determining a maintenance time $T_m$ for which the maintaining phase lasts. The maintenance time control unit 36-3 has a trigger terminal AT and an output terminal AO. When the trigger terminal AT receives the falling termination signal FX, the maintenance time control unit 36-3 starts counting the time. After the maintenance time $T_m$ has been passed, the output terminal AO of the maintenance time control unit 36-3 generates a maintaining termination signal MX for commanding the drive circuit 32 to terminate the operation of the maintaining phase of the synchronous switching circuit 30.

As shown in FIG. 5(A), in the rising phase the switching units S1 and S4 are turned ON while the switching units S2 and S3 are turned OFF such that the first terminal La of the inductor L is coupled to the input voltage $V_{in}$ while the second terminal Lb of the inductor L is coupled to the ground potential. As a result, the inductor current $I_L$ linearly increases with a rate of $V_{in}/L$.

As shown in FIG. 5(B), in the falling phase the switching units S1 and S4 are turned OFF while the switching units S2 and S3 are turned ON such that the first terminal La of the inductor L is coupled to the ground potential while the second terminal Lb of the inductor L is coupled to the output voltage $V_{out}$. As a result, the inductor current $I_L$ linearly decreases with a rate of $V_{out}/L$.

As shown in FIG. 5(C), in the maintaining phase the switching units S1 and S3 are turned OFF while the switching units S2 and S4 are turned ON such that the first and second terminals La and Lb of the inductor L are coupled to the ground potential. Since a potential difference across the first and second terminals La and Lb of the inductor L is rendered zero, the inductor current $I_L$ freely flows around a closed loop so as to maintain at an approximately constant state if finite resistances of the inductor L and the switching units S2 and S4 are neglected.

Referring back to FIGS. 3 and 4, the sleep control unit 37 is triggered to generate a sleep signal SLP at some time in the plurality of phase cycles when the voltage feedback signal $V_{fb}$ reaches a predetermined sleep reference voltage $V_{slp}$. In response to the sleep signal SLP, the drive circuit 32 operates the switching circuit 30 in a sleep period for preventing the first and second terminals La and Lb of the inductor L from being respectively coupled to two selected from a group consisting of the input voltage $V_{in}$, the output voltage $V_{out}$, and the ground potential.

For example, as shown in FIG. 5(D), the synchronous switching circuit 30 in the sleep period may be operated in any one of six operation states Case 1 to Case 6. Regarding Case 1, the first switching unit S1 is turned ON while the second to fourth switching units S2 to S4 are turned OFF such that the first terminal La of the inductor L is coupled to the input voltage $V_{in}$ while the second terminal Lb of the inductor L is floated. Regarding Case 2, the second switching unit S2 is turned ON while the first, third, and fourth switching units S1, S3, and S4 are turned OFF such that the first terminal La of the inductor L is coupled to the ground potential while the second terminal Lb of the inductor L is floated. Regarding Case 3, the third switching unit S3 is turned ON while the first, second, and fourth switching units S1, S2, and S4 are turned OFF such that the first terminal La of the inductor L is floated while the second terminal Lb of the inductor L is coupled to the output voltage $V_{out}$. Regarding Case 4, the fourth switching unit S4 is turned ON while the first to third switching units S1 to S3 are turned OFF such that the first terminal La of the inductor L is floated while the second terminal Lb of the inductor L is coupled to the ground potential. Regarding Case 5, the second and fourth switching units S2 and S4 are turned ON while the first and third switching units S1 and S3 are turned OFF such that the first and second terminals La and Lb of the inductor L are coupled to the ground potential. Regarding Case 6, the first to fourth switching units S1 to S4 are turned OFF such that the first and second terminals La and Lb of the inductor L are floated.

In the sleep period, the supply of the loading current $I_{out}$ is achieved exclusively from the discharge of the output capacitor $C_{out}$. Since the loading current $I_{out}$ is relatively small in the light loading mode, the discharge of the output capacitor $C_{out}$ will not cause a dramatic drop in the output voltage $V_{out}$. For example, the sleep control unit 37 may be implemented by a hysteresis voltage comparator. From time t5 to t6 in FIG. 4, the voltage feedback signal $V_{fb}$ drops by a predetermined hysteresis voltage $V_{hys}$ due to the discharge of the output capacitor $C_{out}$. At time t6, the sleep period is terminated and the operation of the synchronous switching circuit 30 returns to the phase cycles controlled by the phase control unit 36.

In the light loading mode, if the maximum average light loading current $I_{out\_ave(max)}$ cannot satisfies the requirement of the loading current $I_{out}$, the termination unit 38 generates a light loading termination signal LX. In response to the light loading termination signal LX, the drive circuit 32 returns under the control of the buck-boost control circuit 31 for performing the general buck-boost voltage conversion. For example, the termination unit 38 may be implemented by a voltage comparator for comparing the voltage feedback signal $V_{fb}$ and a predetermined threshold voltage $V_{th}$. In the case where the maximum average light loading current $I_{out\_ave(max)}$ cannot satisfies the requirement of the loading current $I_{out}$, the voltage feedback signal $V_{fb}$ demonstrates a tendency to decrease in average. Therefore, the threshold voltage $V_{th}$ is designed such that the voltage comparator of the termination unit 38 is triggered to generate the light loading termination signal LX as soon as the voltage feedback signal $V_{fb}$ decreases below the threshold voltage $V_{th}$. It should be noted that the threshold voltage $V_{th}$ is set lower than the sleep reference voltage $V_{slp}$ minus the hysteresis voltage Vhys for ensuring that the desired function is correctly achieved.

For the phase cycle consisting of the rising, falling, and maintaining phases according to the present invention, assumed that the bottom current $I_{bm}$ is set as a zero, the maximum average light loading current $I_{out\_ave(max)}$ may be calculated from the following equation (3):

$$I_{out\_ave(max)} = \left(\frac{I_{pk}}{2}\right)\left(\frac{V_{out}}{\left(1+\frac{T_m \cdot V_{out}}{I_{pk} \cdot L}\right)V_{in} + V_{out}}\right) \quad (3)$$

As described above, the input voltage $V_{in}$ can be higher than, equal to, or lower than the output voltage $V_{out}$. That is, the buck-boost voltage converter is applicable over a broad range of input voltages $V_{in}$. However, a variation of the input voltage $V_{in}$ induces an influence to the maximum average light loading current $I_{out\_ave(max)}$. More specifically, a partial derivative of the maximum average light loading current $I_{out\_ave(max)}$ of equation (3) with respect to the input voltage $V_{in}$ may be expressed in the following equation (4):

$$\left(\frac{\partial}{\partial V_{in}}\right)I_{out\_ave(max)} = \left(\frac{I_{pk}}{2}\right)\left(\frac{V_{out}}{\left(\left(1+\frac{T_m \cdot V_{out}}{I_{pk} \cdot L}\right)V_{in} + V_{out}\right)^2}\right) \quad (4)$$

Comparing the equations (2) and (4), it is recognized that the partial derivative of the maximum average light loading current $I_{out\_ave(max)}$ with respect to the input voltage $V_{in}$ is suppressed due to the existence of the maintenance time $T_m$ in the light loading mode according to the present invention. In other words, the maintaining phase according to the present invention effectively enhances the stability of the maximum average light loading current $I_{out\_ave(max)}$. Over the broad range of the input voltages $V_{in}$, the light loading control circuit 33 according to the first embodiment of the present invention stably controls the activation and termination of the light loading mode of the buck-boost voltage converter.

It should be noted that the maintenance time $T_m$ is not limited to a constant but may be implemented by a controllable variable. For example, the maintenance time $T_m$ may be set proportional to the input voltage $V_{in}$:

$$T_m = k \cdot V_{in} \quad (5)$$

wherein k is a proportional constant. In such a case, the maximum average light loading current $I_{out\_ave(max)}$ may be calculated by the following equation (6):

$$I_{out\_ave(max)} = \left(\frac{I_{pk}}{2}\right)\left(\frac{V_{in}}{\left(\frac{V_{out} \cdot k}{I_{pk} \cdot L}\right)V_{in}^2 + V_{in} + V_{out}}\right) \quad (6)$$

Therefore, a partial derivative of the maximum average light loading current $I_{out\_ave(max)}$ of equation (6) with respect to the input voltage $V_{in}$ may be expressed in the following equation (7):

$$\left(\frac{\partial}{\partial V_{in}}\right)I_{out\_ave(max)} = \left(\frac{I_{pk}}{2}\right)\left(\frac{V_{out} - \left(\frac{V_{out} \cdot k}{I_{pk} \cdot L}\right)V_{in}^2}{\left(\left(\frac{V_{out} \cdot k}{I_{pk} \cdot L}\right)V_{in}^2 + V_{in} + V_{out}\right)^2}\right) \quad (7)$$

According to equation (7), it is recognized that when the input voltage $V_{in}$ satisfies the following equation (8):

$$V_{in} = \sqrt{\frac{I_{pk} \cdot L}{k}} \quad (8)$$

the maximum average light loading current $I_{out\_ave(max)}$ is prevented from being influenced by the variation of the input voltage $V_{in}$. Therefore, if the proportional constant k is so selected as to locate the value of equation (8) in the middle of the operational range of the input voltage $V_{in}$, the influence to the maximum average light loading current $I_{out\_ave(max)}$ induced with respect to the variation of the input voltage $V_{in}$ is effectively suppressed.

Figure 6:
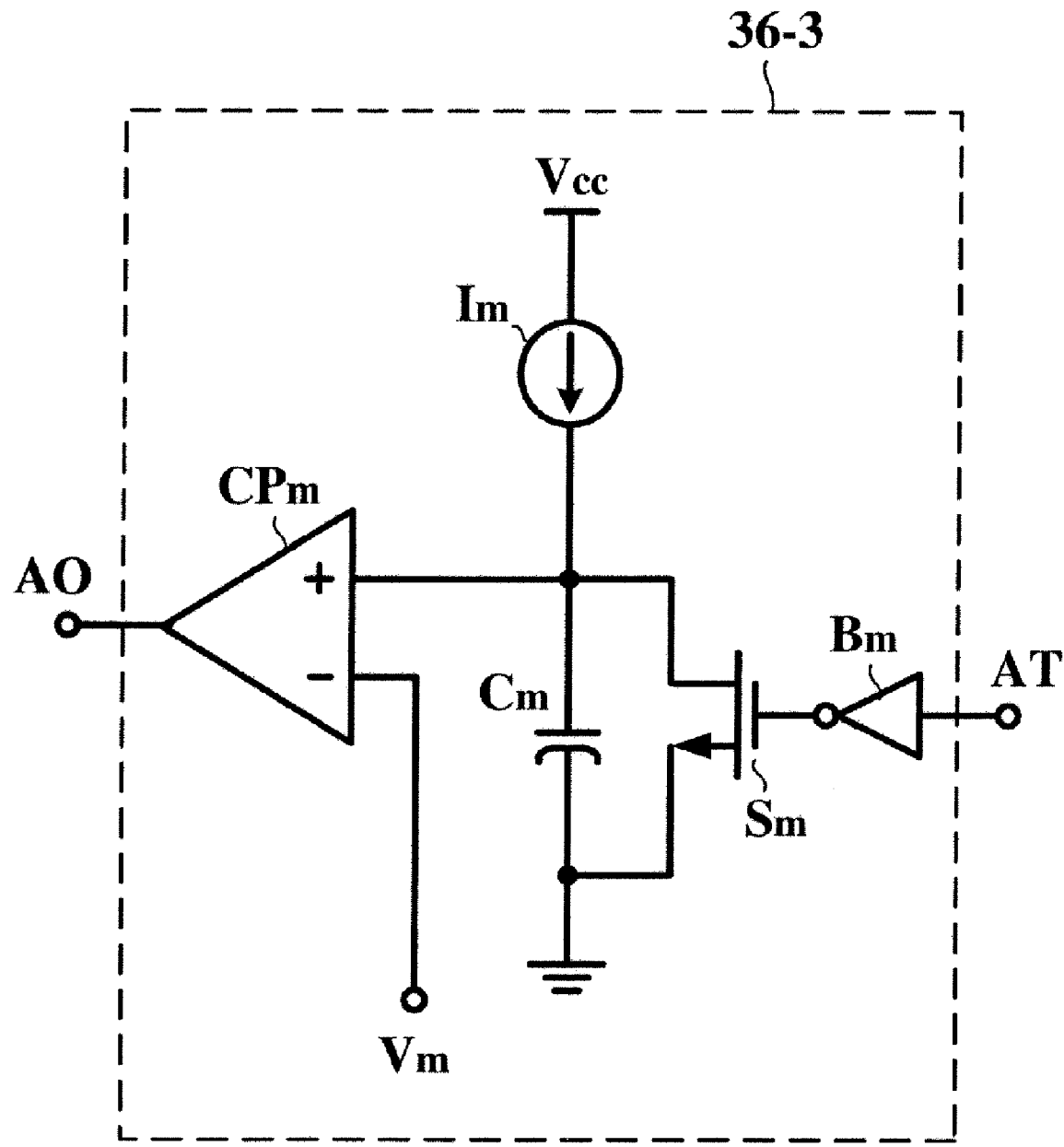
FIG. 6 is a detailed circuit diagram showing a maintenance time control unit according to a first embodiment of the present invention.

FIG. 6 is a detailed circuit diagram showing the maintenance time control unit 36-3 according to the first embodiment of the present invention. Referring to FIG. 6, the maintenance time control unit 36-3 may include a voltage comparator $CP_m$, a current source $I_m$, a capacitor $C_m$, an NMOS transistor $S_m$, and a buffer inverter $B_m$. The NMOS transistor $S_m$ has a gate electrode, serving as the trigger terminal AT of the maintenance time control unit 36-3, for receiving the falling termination signal FX through the buffer inverter $B_m$. The voltage comparator $CP_m$ has an output terminal, serving as the output terminal AO of the maintenance time control unit 36-3, for providing the maintaining termination signal MX. At the termination of the falling phase, i.e. the inductor current $I_L$ decreases to reach the bottom current $I_{bm}$, the falling termination signal FX changes to a high level state from a low level state. As a result, the NMOS transistor $S_m$ is turned OFF such that the current source $I_m$ starts charging the capacitor $C_m$. As soon as a potential difference across the capacitor $C_m$ linearly increases to reach a predetermined maintenance time reference voltage $V_m$, the voltage comparator $CP_m$ is triggered to cause the maintaining termination signal MX to change to a high level state from a low level state. Therefore, the maintenance time $T_m$ is determined by the maintenance time control unit 36-3.

Figure 7A:
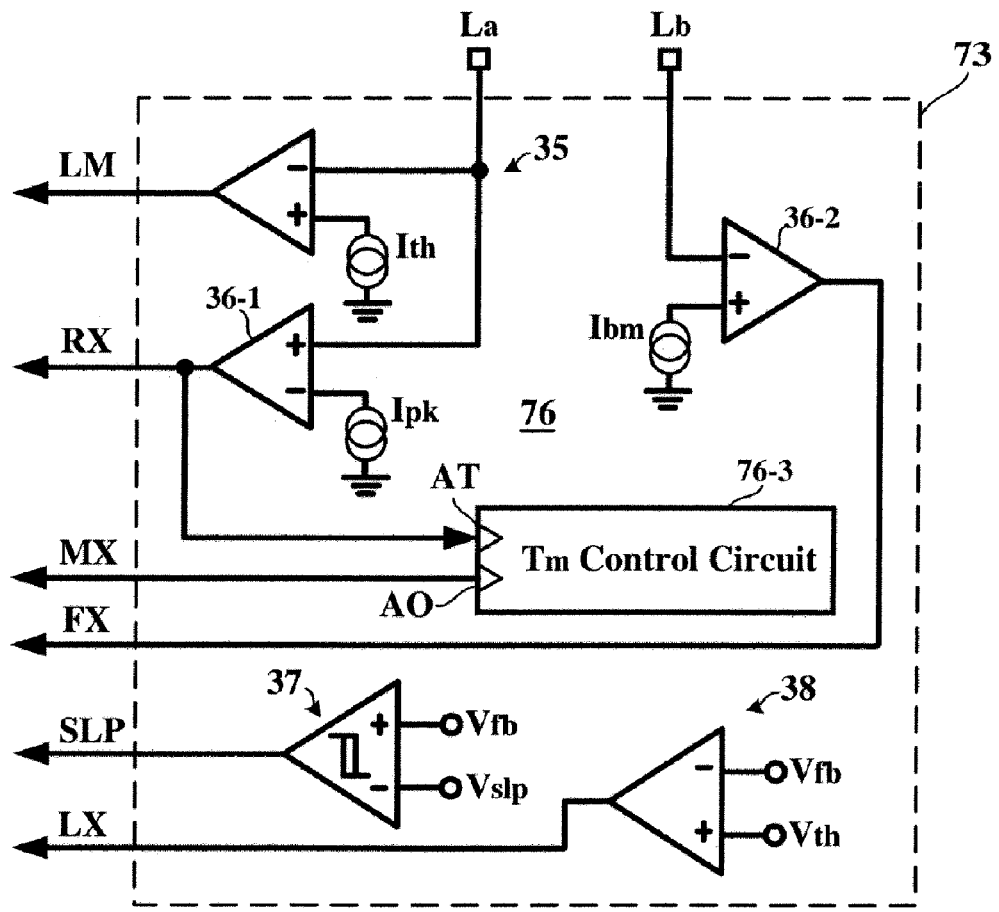
FIG. 7(A) is a circuit diagram showing a light loading control circuit according to a second embodiment of the present invention.
Figure 7B:
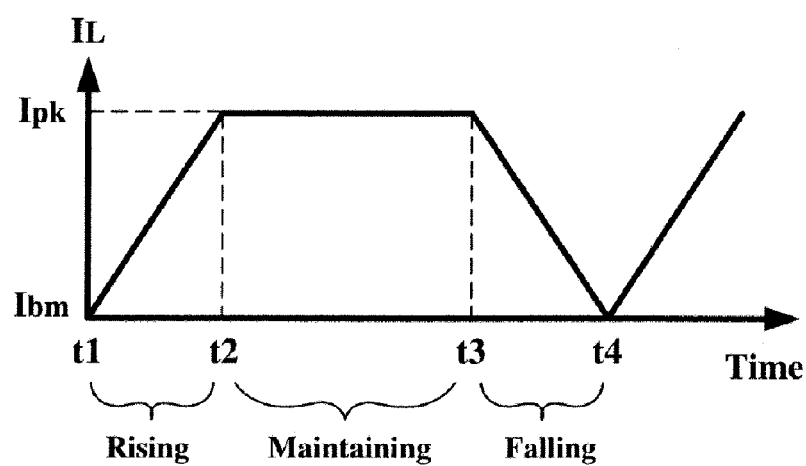
FIG. 7(B) is a timing chart showing an inductor current in the light loading mode according to a second embodiment of the present invention.

FIG. 7(A) is a circuit diagram showing a light loading control circuit 73 according to a second embodiment of the present invention. The second embodiment is different from the first embodiment in that the maintenance time control unit 76-3 of the second embodiment is triggered by the rising termination signal RX to start counting the maintenance time $T_m$. Therefore, in the light loading mode of the second embodiment, the maintaining phase occurs immediately after the rising phase. Referring to FIG. 7(B), in the rising phase from time t1 to t2, the inductor current $I_L$ linearly increases from the bottom current $I_{bm}$ to the peak current $I_{pk}$. In the maintaining phase from time t2 to t3, the inductor current $I_L$ is kept approximately constant, i.e. at the peak current $I_{pk}$ at time t2. In the falling phase from time t3 to t4, the inductor current $I_L$ linearly decreases from the peak current $I_{pk}$ to the bottom current $I_{bm}$.

Figure 8A:
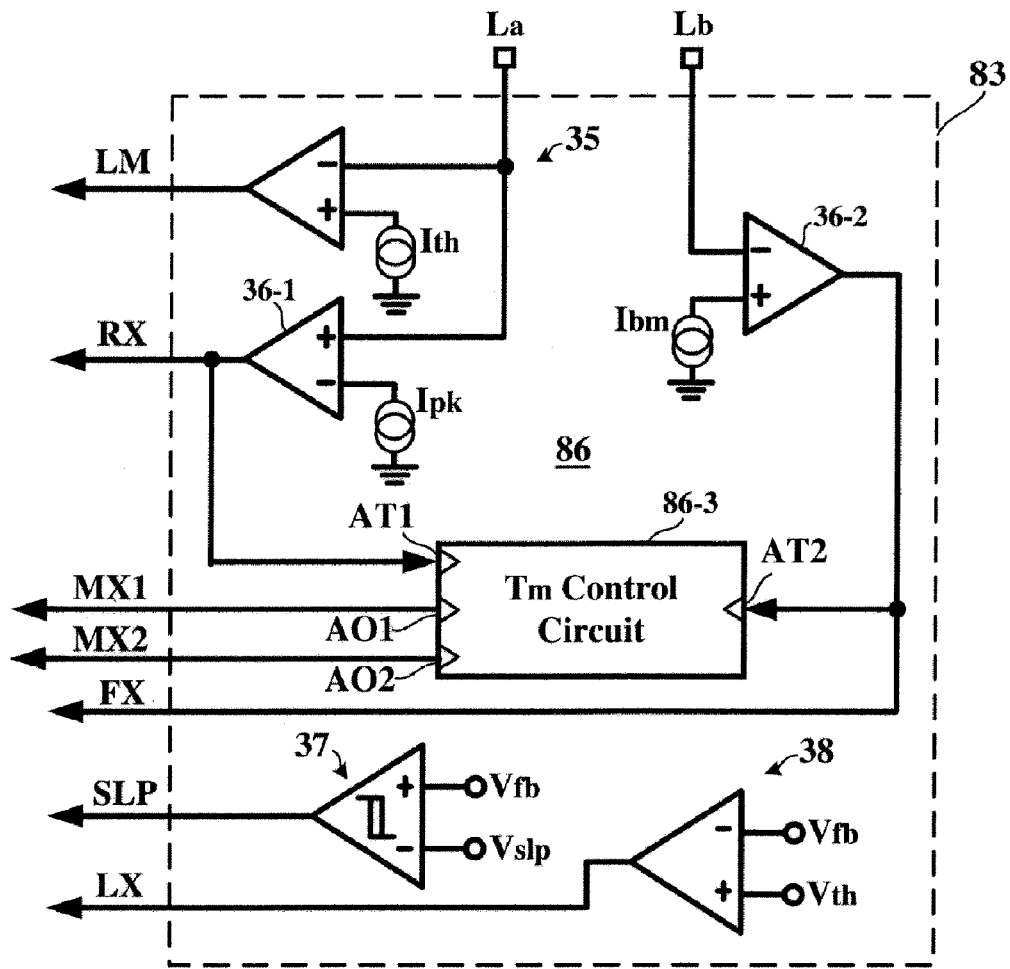
FIG. 8(A) is a circuit diagram showing a light loading control circuit according to a third embodiment of the present invention.

FIG. 8(A) is a circuit diagram showing a light loading control circuit 83 according to a third embodiment of the present invention. The third embodiment is different from the first embodiment in that the maintenance time control unit 86-3 of the third embodiment has a first trigger terminal AT1 and a second trigger terminal AT2 and a first output terminal AO1 and a second output terminal AO2. The first trigger terminal AT1 is triggered by the rising termination signal RX so as to start counting a first maintenance time $T_{m1}$. After the first maintenance time $T_{m1}$ has been passed, the first output terminal AO1 outputs a first maintaining termination signal MX1. Therefore, in the light loading mode of the third embodiment, the first maintaining phase occurs immediately after the rising phase. The second trigger terminal AT2 is triggered by the falling termination signal FX so as to start counting a second maintenance time $T_{m2}$. After the second maintenance time $T_{m2}$ has been passed, the second output terminal AO2 outputs a second maintaining termination signal MX2. Therefore, in the light loading mode of the third embodiment, the second maintaining phase occurs immediately after the falling phase.

Figure 8B:
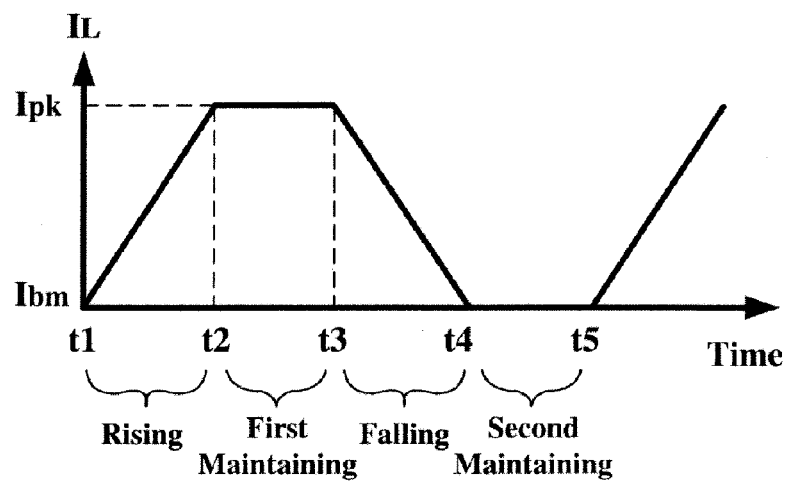
FIG. 8(B) is a timing chart showing an inductor current in the light loading mode according to a third embodiment of the present invention.

Referring to FIG. 8(B), in the rising phase from time t1 to t2, the inductor current $I_L$ linearly increases from the bottom current $I_{bm}$ to the peak current $I_{pk}$. In the first maintaining phase from t2 to t3, the inductor current $I_L$ is kept approximately constant, i.e. at the peak current $I_{pk}$ at time t2. In the falling phase from time t3 to t4, the inductor current $I_L$ linearly decreases from the peak current $I_{pk}$ to the bottom current $I_{bm}$. In the second maintaining phase from time t4 to t5, the inductor current $I_L$ is kept approximately constant, i.e. at the bottom current $I_{bm}$ at time t4.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A light loading control circuit for controlling a switching circuit having an input switching unit and an output switching unit, the input switching unit selectively coupling a first terminal of an inductor to an input voltage and a ground potential, the output switching unit selectively coupling a second terminal of the inductor to an output voltage and the ground potential, the light loading control circuit comprising:
   a phase control unit for operating the switching circuit in a plurality of phase cycles, each of which has:
   a rising phase for increasing an inductor current flowing through the inductor;
   a falling phase for decreasing the inductor current; and
   a maintaining phase for keeping the inductor current approximately constant, and
   a sleep control unit for operating the switching circuit in a sleep period after the output voltage reaches a predetermined sleep reference voltage, for preventing the first terminal and the second terminal from being respectively coupled to two selected from a group consisting of the input voltage, the output voltage, and the ground potential.

2. The circuit according to claim 1, wherein for each phase cycle:
   the falling phase occurs after the rising phase, and
   the maintaining phase occurs after the falling phase.

3. The circuit according to claim 1, wherein for each phase cycle:
   the maintaining phase occurs after the rising phase, and
   the falling phase occurs after the maintaining phase.

4. The circuit according to claim 1, wherein for each phase cycle:
   the maintaining phase is divided into a first maintaining phase and a second maintaining phase, such that:
   the first maintaining phase occurs after the rising phase;
   the falling phase occurs after the first maintaining phase; and
   the second maintaining phase occurs after the falling phase.

5. The circuit according to claim 1, wherein:
   the maintaining phase lasts for a period of time which is proportional to the input voltage.

6. The circuit according to claim 1, wherein:
   in the rising phase the input switching unit couples the first terminal to the input voltage and the output switching unit couples the second terminal to the ground potential.

7. The circuit according to claim 1, wherein:
   in the falling phase the input switching unit couples the first terminal to the ground potential and the output switching unit couples the second terminal to the output voltage.

8. The circuit according to claim 1, wherein:
   in the maintaining phase the input switching unit couples the first terminal to the ground potential and the output switching unit couples the second terminal to the ground potential.

9. A light loading control circuit for controlling a switching circuit having an input switching unit and an output switching unit, the input switching unit selectively coupling a first terminal of an inductor to an input voltage and a ground potential, the output switching unit selectively coupling a second terminal of the inductor to an output voltage and the ground potential, the light loading control circuit comprising:
   a phase control unit for operating the switching circuit in a plurality of phase cycles, each of which has:
   a first phase for causing a potential difference across the first terminal and the second terminal to have a first polarity;

a second phase for causing the potential difference across the first terminal and the second terminal to have a second polarity opposite to the first polarity; and a third phase for causing the potential difference across the first terminal and the second terminal to be substantially zero, and a sleep control unit for operating the switching circuit in a sleep period after the output voltage reaches a predetermined sleep reference voltage, for preventing the first terminal and the second terminal from being respectively coupled to two selected from a group consisting of the input voltage, the output voltage, and the ground potential.

10. The circuit according to claim 9, wherein for each phase cycle:
the second phase occurs after the first phase, and
the third phase occurs after the second phase.

11. The circuit according to claim 9, wherein for each phase cycle:
the third phase occurs after the first phase, and
the second phase occurs after the third phase.

12. The circuit according to claim 9, wherein:
the third phase lasts for a period of time which is proportional to the input voltage.

13. The circuit according to claim 9, wherein:
in the sleep period the input switching unit couples the first terminal to the input voltage and the output switching unit causes the second terminal to be floated.

14. The circuit according to claim 9, wherein:
in the sleep period the input switching unit couples the first terminal to the ground potential and the output switching unit causes the second terminal to be floated.

15. The circuit according to claim 9, wherein:
in the sleep period the input switching unit causes the first terminal to be floated and the output switching unit couples the second terminal to the output voltage.

16. The circuit according to claim 9, wherein:
in the sleep period the input switching unit causes the first terminal to be floated and the output switching unit couples the second terminal to the ground potential.

17. The circuit according to claim 9, wherein:
in the sleep period the input switching unit couples the first terminal to the ground potential and the output switching unit couples the second terminal to the ground potential.

18. The circuit according to claim 9, wherein:
in the sleep period the input switching unit causes the first terminal to be floated and the output switching unit causes the second terminal to be floated.

19. A buck-boost voltage converter operating in a first mode and a second mode, comprising:
a switching circuit having an input switching unit and an output switching unit, the input switching unit selectively coupling a first terminal of an inductor to an input voltage and a ground potential, the output switching unit selectively coupling a second terminal of the inductor to an output voltage and the ground potential;
a drive circuit for driving the switching circuit;
a buck-boost control circuit for controlling the switching circuit through the drive circuit in the first mode such that the input voltage is converted to the output voltage; and
a light loading control circuit for controlling the switching circuit through the drive circuit in the second mode such that the switching circuit is operated alternately in a plurality of phase cycles and a sleep period, wherein:
each of the plurality of phase cycles has:
a rising phase for increasing an inductor current flowing through the inductor;
a falling phase for decreasing the inductor current; and
a maintaining phase for keeping the inductor current approximately constant, and
the sleep period prevents the first terminal and the second terminal from being respectively coupled to two selected from a group consisting of the input voltage, the output voltage, and the ground potential.

20. A buck-boost voltage converter operating in a first mode and a second mode, comprising:
a switching circuit having an input switching unit and an output switching unit, the input switching unit selectively coupling a first terminal of an inductor to an input voltage and a ground potential, the output switching unit selectively coupling a second terminal of the inductor to an output voltage and the ground potential;
a drive circuit for driving the switching circuit;
a buck-boost control circuit for controlling the switching circuit through the drive circuit in the first mode such that the input voltage is converted to the output voltage; and
a light loading control circuit for controlling the switching circuit through the drive circuit in the second mode such that the switching circuit is operated alternately in a plurality of phase cycles and a sleep period, wherein:
each of the plurality of phase cycles has:
a first phase for causing a potential difference across the first terminal and the second terminal to have a first polarity;
a second phase for causing the potential difference across the first terminal and the second terminal to have a second polarity opposite to the first polarity; and
a third phase for causing the potential difference across the first terminal and the second terminal to be substantially zero, and
the sleep period prevents the first terminal and the second terminal from being respectively coupled to two selected from a group consisting of the input voltage, the output voltage, and the ground potential.

* * * * *